Patented Dec. 15, 1925.

1,565,345

UNITED STATES PATENT OFFICE.

JOSEF WEBER, OF ESSEN, AND PAUL ERASMUS, OF BERLIN-WILMERSDORF, GERMANY, ASSIGNORS TO THE FIRM TH. GOLDSCHMIDT A.-G., OF ESSEN, GERMANY.

PROCESS OF PRODUCING METHYL ALCOHOL AND METHYLENE CHLORIDE FROM METHANE.

No Drawing.      Application filed April 8, 1925. Serial No. 21,690.

*To all whom it may concern:*

Be it known that we, JOSEF WEBER and PAUL ERASMUS, citizens of the German Republic, residing at 18 Salkenbergsweg, Essen, and 133 Wilhelmsaue, Berlin-Wilmersdorf, Germany, have invented certain new and useful Improvements in a Process of Producing Methyl Alcohol and Methylene Chloride from Methane, of which the following is a specification.

This invention relates to a process of producing methyl alcohol and methylene chloride from methane.

Repeated attempts have been made to produce methyl alcohol from methyl chloride by saponification. United States Patent No. 1,253,055 contains a brief review of this art and discloses a process according to which methyl chloride is saponified to methyl alcohol by contacting methyl chloride gas with hot milk of lime. The methyl chloride used for this purpose is generally obtained by chlorination of methane. In the chlorination of methane however as is well known, the chlorine must be always kept insufficient, because the reaction will otherwise be extremely violent and may easily give rise to explosions. In spite of the deficiency in chlorine, it is not possible to avoid other chlorination products of methane besides methyl chloride being formed in the current of methane gas—mainly methylene chloride—which are unsuitable for saponification to form methyl alcohol.

According to the known processes the methyl chloride must first be isolated from these undesirable by-products in order to enable it to be subjected to the saponification process. This isolation of methyl chloride is however very expensive and cumbersome, for which reason the known processes of producing methyl alcohol from methane have not found a proper practical application.

The present invention relates to a new and simplified process of producing methyl alcohol from methane with the simultaneous recovery of methylene chloride. This process consists in treating the chlorinated methane gas-current under pressure with milk of lime whereby only the methyl chloride contained therein, is saponified and retained whilst the methylene chloride which is likewise formed during chlorination passes away, under maintenance of the pressure, with the remaining gases to be subjected to condensation at low temperatures. During this cooling the methylene chloride is separated out and the remaining gas which is now free from chlorination products and which consists mainly of excess methane and inert constituents is returned to the chlorination process.

The process may for example be carried out by using, in the chlorination of the methane, a deficiency of chlorine in the hitherto usual manner. Methyl chloride and methylene chloride besides hydrochloric acid are formed in the methane gas current as principal chlorination products. The hydrochloric acid, is recovered first from the gas current by known separation methods. The gas mixture which is then free from hydrochloric acid and which mainly consists of methyl chloride, methylene chloride, excess methane and inert constituents, if forced by a blower into the saponification vessel, wherein it is treated under pressure with milk of lime. By this means the methyl chloride is saponified and remains as methyl alcohol in the saponification vessel. The unabsorbed gas containing the methylene chloride is passed under pressure into a cooling apparatus, wherein the methylene chloride is separated out.

Owing to the fact that the pressure required for the saponification is kept up, the advantage is obtained that there is no necessity to employ excessively low temperatures in order to separate out the methylene chloride.

After having been submitted to low-temperature cooling, the remaining gases which now only contain methane and inert constituents, are returned to the clorination process after fresh methane has been added thereto.

In this manner a process is provided which proceeds uninterruptedly from beginning to end. The products formed during the chlorination of methane, that is, methyl chloride and methylene chloride remain in admixture until they enter the saponification vessel where they are automatically separated by the saponification process. This latter therefore effects not only the transformation of the methyl chloride into methyl alcohol, but also the separation of the methyl chloride from those substances contained in the methane gas-current which are unsuitable for saponification, namely methylene chloride.

What we claim is:

1. In processes for the production of methyl alcohol by causing methyl chloride gas to react in a closed chamber under pressure and at an elevated temperature with milk of lime, the steps which consist in introducing the methyl chloride admixed with methylene chloride into the closed chamber, and withdrawing unabsorbed gas comprising methylene chloride from the chamber.

2. In processes for the production of methyl alcohol by causing methyl chloride gas to react in a closed chamber under pressure and at an elevated temperature with milk of lime, the steps which consist in introducing a gas mixture produced by limited chlorination of methane and separation of hydrochloric acid into the chamber, and delivering unabsorbed gases under the pressure in the chamber to a condenser.

3. In processes for the production of methyl alcohol by causing methyl chloride gas to react in a closed chamber under pressure and at an elevated temperature with milk of lime, the steps which consist in introducing a gas mixture comprising methyl chloride, methylene chloride and methane into the chamber, delivering unabsorbed gases comprising methylene chloride and methane under the pressure in the chamber to a condenser, and separating the condensed methylene chloride from the methane.

In testimony whereof we affix our signatures.

JOSEF WEBER.
PAUL ERASMUS.